June 20, 1967 L. N. CANICK ET AL 3,326,054
LIMIT STOP
Filed Oct. 5, 1965 2 Sheets-Sheet 1
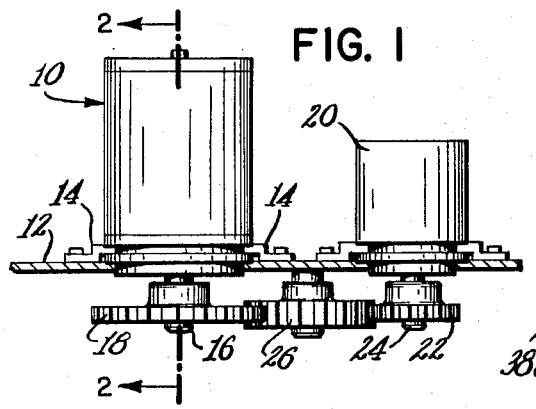
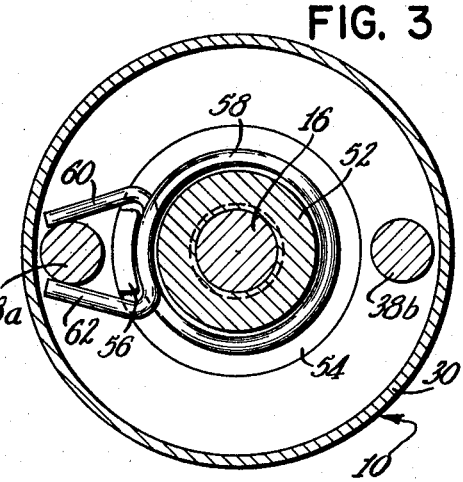
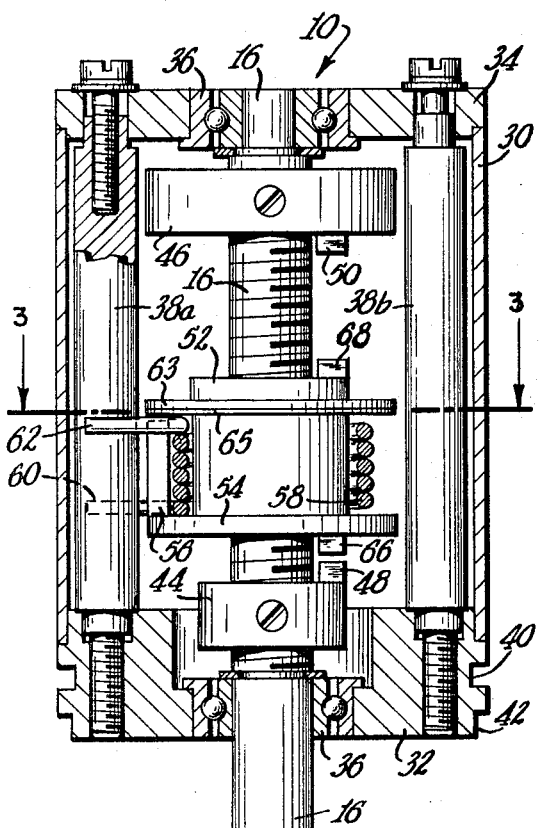
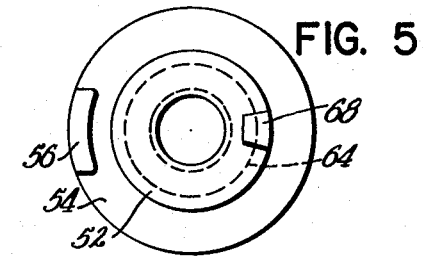
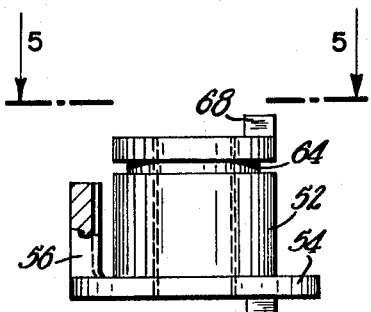
INVENTORS.
LEON N. CANICK
CHARLES S. ALDRICH
BY
Leonard H. King
ATTORNEY June 20, 1967    L. N. CANICK ETAL    3,326,054
LIMIT STOP Filed Oct. 5, 1965    2 Sheets-Sheet 2

INVENTORS.
LEON N. CANICK
CHARLES S. ALDRICH
BY Leonard H. King
ATTORNEY

United States Patent Office 3,326,054
Patented June 20, 1967

3,326,054
LIMIT STOP
Leon N. Canick, 6700 192nd St., Fresh Meadows, N.Y. 11365, and Charles S. Aldrich, 205 Hawthorne Road, Kings Park, N.Y. 11754
Filed Oct. 5, 1965, Ser. No. 493,007
8 Claims. (Cl. 74—10.2)

This invention relates generally to limit stops and more particularly to means for resiliently stopping the rotation of a shaft at the end of a predetermined angular displacement.

It is frequently desirable, and in some instances necessary, to limit the angular displacement of a rotating shaft. For example, single or multi-turn potentiometers are designed to operate over a particular angular range. Forcing the shaft to rotate beyond its limits in either direction can seriously damage a costly piece of equipment. Accordingly stops are provided.

However, in some cases, particularly if the ultilization device is fragile or sensitive, it is not enough to merely stop the shaft at a given point. Forces of inertia transmit shocks that could have a deleterious effect on the equipment if the shaft is abruptly stopped. Accordingly, the present invention provides spring means to resiliently stop a rotating shaft in order to cushion or absorb the shock and thus prevent damage to the system. Generally, the stopping action commences at a point prior to the final stop angle so that angular rotation of the utilization is slowly and progressively retarded until a maximum stopping force is built up at the stopping angle.

In certain other applications the final stop may not be reached. In this case the spring is designed to absorb all rotational energy ($\frac{1}{2}I\omega^2$) of the utilization device before a rigid stopping point is reached. If all the energy cannot be absorbed because of design considerations, the final stopping shock is nevertheless reduced because of the spring action. Generally the final stopping point is indeterminate since it depends on the velocity of the utilization device, which may vary. If an exact stopping position is required the spring is designed not to absorb all of system energy.

The present invention comprises a threaded rotating shaft coupled to the shaft of the utilization device which has limited angular motion. A gear train would be typical of the coupling means. An axially displaceable nut is carried by a rotating shaft, the nut being prevented from turning by a torsion spring which straddles a member fixed with respect to the housing. A post integral with the nut is also straddled by the ends of the torsion spring.

A first pair of axially opposed spaced lugs are rigidly secured to the threaded shaft and are arranged to rotate therewith and to angularly abut a second pair of lug members, each one of which is integral with a transverse face of the axially moving nut. Abutment occurs at the ends of the axial travel of the nut and prior to the permissible limits of rotary travel of the utilization device shaft. Forces resulting from the abutment of the axially moving nut and either one of the rotating lugs will be absorbed by the torsion spring through the post integral with the nut.

Also included are a pair of spaced studs extending parallel to the longitudinal axis of the threaded shaft. The first stud is straddled by the ends of the torsion spring thus effectively limiting the motion of the nut to only axial displacement, except for intentionally introduced angular overtravel. The second stud is angularly spaced from the first stud and provides a final stopping point for the shaft of the utilization device. The final stopping point may be varied as required by the addition of still other studs or by providing a pair of movable stop members to replace the studs, the stop members being angularly adjustable in two opposite directions.

The instant invention achieves the foregoing action within a very small envelope thus making the device applicable to miniaturized systems so common in present day technology. The axial spacing of the rotating lug members may be set as required to service either a single turn or multi-turn utilization device. Furthermore, a high degree of accuracy, reliability, and long life may be incorporated at reasonable costs with readily available materials, commonly used manufacturing techniques and assembly procedures standard in the field of instrumentation.

Accordingly, it is an object of the present invention to provide an improved limit stop that is accurate and reliable over a long life.

Another object is to provide means to resiliently limit the shaft rotation of a utilization device.

A further object is to provide a limit stop having an adjustable range of operation.

An additional object is to provide a limit stop that may be coupled to either a single or multi-turn utilization device as well as one having less than a single turn.

Still another object is to provide a limit stop that tends to retard the angular motion of a utilization device at some time prior to fully stopping the utilization device.

Another object is to provide a limit stop that increases its stopping force as the utilization device approaches its stop angle.

These and other features, objects and advantages of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the drawing:

FIG. 1 is an elevation view illustrating a typical environment of the present invention;

FIG. 2 is an enlarged sectional elevation view of the present invention taken along line 2—2 of FIG. 1;

FIG. 3 is a sectional plan view taken along line 3—3 of FIG. 2;

FIG. 4 is an elevation view of one component of the present invention;

FIG. 5 is a plan view taken along line 5—5 of FIG. 4;

Figure 6:
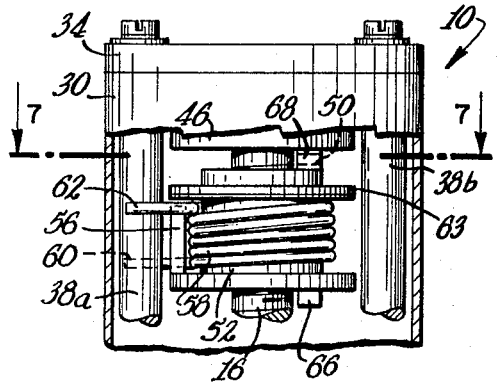
FIG. 6 is an enlarged fragmentary elevational view, partly in section, illustrating one extreme position of the present invention.

Referring now to the drawing, the device 10 of the present invention is shown in FIG. 1 as mounted on a panel 12 by means of a plurality of clamps 14 each having one end engaged in an annular groove of the device housing, the other end of each clamp being secured to the panel. Shaft 16 extends from device 10 through the panel and has a gear 18 secured to the outer end thereof. Utilization device 20, which may be a multi-turn potentiometer for example, is similarly secured to the panel and also has a gear 22 secured to its rotating shaft 24. In the embodiment shown in FIG. 1, a gear train 26 is utilized to couple the shafts of the limit stop and the utilization device.

FIG. 2 and FIG. 3 illustrate the internal construction of the present device. The housing therefor is comprised of a central, open ended shell 30 on which are mounted closure members 32 and 34. Bearings 36 are disposed in the closure members to rotatably support shaft 16, the internal portion of which is threaded. Studs 38a and 38b spacedly support the closure members and are threadably connected thereto. Other functions of the studs will be brought out in greater detail hereinafter. Closure member 32 is provided with an annular groove 40 and a piloting diameter 42 to facilitate panel mounting. It should be understood, however, that other conventional mounting means may be employed.

Discs 44 and 46 are rigidly secured to shaft 16 by set screws, pins or other suitable means, and are formed with a first pair of lug members 48 and 50, respectively, extending axially from their opposed transverse faces. It should be noted that discs 44 and 46 are internally threaded to thereby facilitate their accurate angular placement and to permit adjustment thereof with respect to shaft 16. Accordingly, the lug carrying discs rotate together with shaft 16. The angular location of the rotating lug members is determined by the user's requirement of total stop angle. Lug members 48 and 50 are therefore preset with respect to a second pair of mating lug members which are linearly movable but non-rotatable on shaft 16.

The threaded portion of shaft 16 also carries an internally threaded nut or hub member 52 (FIG. 4 and FIG. 5) having an integral, enlarged flange 54. Post 56 is integral with the flange and extends upwardly therefrom parallel to the longitudinal axis of the device and spaced from the side of the hub. A torsion spring 58, having end portions 60 and 62, is deployed about hub 52 and between the hub and the post such that stud 38a and post 56 are both straddled by the spring ends. The spring is captured between flange 54 and a retaining ring 63 secured in annular groove 64 formed in the opposite end of the hub. A washer 65 is also included. Second lug members 66 and 68 are formed integrally on the opposed transverse faces of hub 52 and cooperate with first lug members 48 and 50, respectively, in a manner now to be described.

Figure 7:
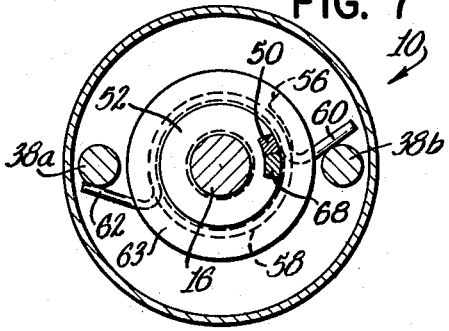
FIG. 7 is a sectional plan view illustrating overtravel after the position shown in FIG. 6.

Referring now to FIG. 6 and FIG. 7, it will be seen that, under the influence of the rotation of shaft 16 by the utilization device, hub member 52 has axially advanced to a position proximate one end of the device. Lug 68, which has been advanced axially without rotating, because of the interaction of spring ends 60 and 62 with stud 38a and post 56, is in abutting, face-to-face relationship with lug 50 rotatingly carried by shaft 16. The force of impact of the two lugs, as well as a limited, predetermined overtravel, is taken up by the torsion spring which is deflected in the same angular direction as the shaft motion shown in FIG. 7. Stud 38b stops the travel of the spring end.

Figure 8:
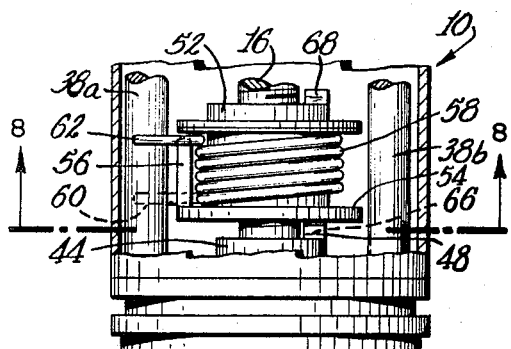
FIG. 8 is an enlarged fragmentary elevational view, partly in section, illustrating the extreme position of the present invention axially opposite to that of FIG. 6.
Figure 9:
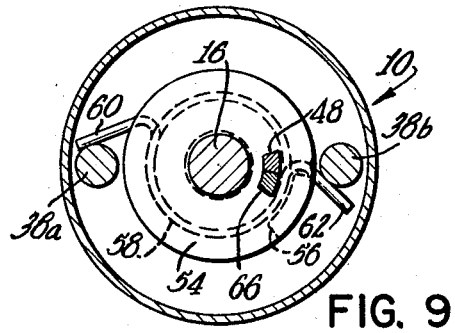
FIG. 9 is a sectional plan view illustrating overtravel after the position shown in FIG. 8.

The opposite direction of angular travel of the utilization device is illustrated by the physical relationship of lug members 48 and 66 in FIG. 8 and FIG. 9. Hub member 52 is in its lowermost position having moved axially while shaft 16 is rotated. The impact when the two lugs come into face-to-face abutment is absorbed by the torsion spring, one leg of which is deflected by post 56 until the spring leg is stopped by stud 38b.

By way of example, the present invention may be coupled to a ten-turn potentiometer wherein the full scale shaft rotation before stop engagement is set at 3500 degrees ±20 degrees. Nominally, the spring starts engagement at 150 degrees prior to the prescribed stop angle at both ends. For example, the nominal torque rating of the spring would be 0.15 in. oz. per degree or 22.5 in. oz. at 150 degrees where the stop is made complete. It is to be understood that the torque gradient could be changed by using other springs. Alternatively, narrower limits may be imposed merely by axially resetting the discs that carry the rotating upper and lower stops. A wider range of limits may be achieved either by lengthening the threaded internal portion of the main shaft or by judicious selection of the gear train that couples shaft 16 to the utilization device.

Figure 10:
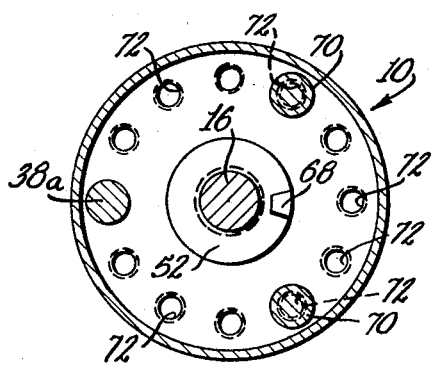
FIG. 10 is a sectional plan view of an alternative embodiment of the present invention.
Figure 11:
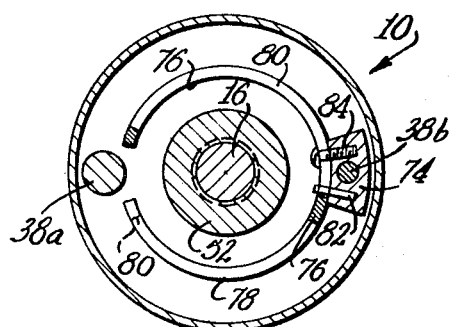
FIG. 11 is a fragmentary sectional plan view of still another embodiment of the present invention.

Alternative means for preselecting the degree of overtravel are illustrated in FIG. 10 and FIG. 11. In the embodiment of FIG. 10 a plurality of studs 70 are provided, there being a plurality of mating threaded apertures 72 formed in the closure members to receive the studs. Depending upon the overtravel requirements of the utilization device, different apertures are selected to receive a pair of studs.

FIG. 11 illustrates still another alternative embodiment for determining the degree of overtravel of both spring ends. Whereas the embodiment of FIG. 10 limits the overtravel to preselected angular increments, the structure shown in FIG. 11 limits overtravel of almost any degree. Stud 38b has a block 74 integrally secured thereto. Arcuate arms 76 and 78 are slidably secured to the block. Each of the arms have an elongated slot 80 through which guide pin 82 and clamping crew 84 extend. The pins, in combination with screw shanks, serve to keep the arms in a horizontal plane. Arms 76 and 78 are disposed one above the other and are each individually settable by their respective clamping screws at various angles to serve as stops for the spring ends 60 and 62, respectively. Both the embodiments shown in FIG. 10 and FIG. 11 function in the manner described in connection with FIG. 2.

The apparatus described hereinabove is compact yet rugged and therefore capable of a long and useful life. The angular limitations imposed on the utilization device may be readily selected from within a very wide range and may be very accurately set. In addition, the present invention cushions and absorbs the angular inertial forces of the rotating members so that delicate components of the utilization device are protected.

There has been disclosed heretofore the best embodiment of the invention presently contemplated and it is to be understood that various changes and modifications may be made by those skilled in the art without departing from the spirit of the invention.

What is claimed is:

1. Apparatus adapted to be coupled to the rotatable shaft of a utilization device for limiting the rotational movement thereof, said apparatus comprising:
   (a) a housing;
   (b) a shaft rotatably journaled in said housing;
   (c) a first pair of lugs rigidly secured in axially opposed spaced relation on said shaft for rotation therewith;
   (d) a second pair of lugs mounted on said shaft intermediate said first pair of lugs for axial displacement with respect thereto, each of said second lugs being arranged for abutting engagement with one of said first lugs at the end of axial displacement whereby continued rotation of said shaft after abutment causes said first lug to angularly displace said abutting second lug;
   (e) a post member integral with said second lugs and rotatable therewith subsequent to the abutment of said first and second lugs;
   (f) helically coiled spring means wound about said shaft, said spring having a pair of legs disposed in a plane perpendicular to said post member, one leg of said spring being positioned on each side of said post member, said legs being arranged for angular displacement together with said post member subsequent to the abutment of said first and second lugs;
   (g) means to prevent angular displacement of the pair of spring legs during the axial displacement of said second lugs prior to the abutment of said first and second lugs; and (h) means to stop the angular movement of said post member and said displaced spring leg after a predetermined displacement thereof.

2. The apparatus in accordance with claim 1 wherein at least a portion of said shaft and said first lugs are matingly threaded whereby the angular position of said first lugs may be varied with respect to said second lugs by rotating said first lugs on said shaft.

3. The apparatus in accordance with claim 2 including first and second discs integral with said first pair of lugs, respectively, said first and second discs being threaded and rigidly secured to said shaft.

4. The apparatus in accordance with claim 1 wherein said spring member is a torsion spring having a body portion disposed about said shaft and said pair of legs extending outwardly.

5. The apparatus in accordance with claim 1 wherein said means to prevent angular displacement of said spring legs comprises a first stud fixedly positioned in said housing with respect to said spring, the legs of said spring being disposed on either side of said first stud during axial movement of said second pair of lugs.

6. The apparatus in accordance with claim 1 wherein said means to stop the angular movement of said post member and one of said spring legs comprises at least one additional second stud fixedly positioned in said housing with respect to said spring and angularly spaced from said first stud.

7. The apparatus in accordance with claim 1 wherein said means to stop the angular movement of said post member and one of said spring legs comprises a pair of studs selectively positionable at a plurality of different locations with respect to the original location of said post member, said pair of studs being in a plane perpendicular to the plane of movement of said spring legs.

8. The apparatus in accordance with claim 1 wherein said means to stop the angular movement of said post member and one of said spring legs comprises a pair of arcuately adjustable arms, the end of each arm being movable in the plane of one of said spring legs whereby said spring leg abuts said arm after a predetermined angular displacement and means to retain said arms in the adjusted position.

References Cited

UNITED STATES PATENTS

| | | | |
|---|---|---|---|
| 2,620,911 | 12/1952 | Krell | 192—141 |
| 3,262,535 | 7/1966 | De Pasqua | 192—141 |
| 3,293,925 | 12/1966 | Linsley | 74—10.2 |

MILTON KAUFMAN, *Primary Examiner.*